United States Patent [19]
Nohr

[11] Patent Number: 6,036,211
[45] Date of Patent: Mar. 14, 2000

[54] BICYCLE FRONT SUSPENSION

[76] Inventor: Mark W. Nohr, 1962 San Bruno, Newport Beach, Calif. 92660

[21] Appl. No.: 08/637,371

[22] Filed: Apr. 25, 1996

[51] Int. Cl.[7] .................................................. B62K 21/02
[52] U.S. Cl. ........................................... 280/276; 280/277
[58] Field of Search ................................... 280/276, 277, 280/286, 275, 283

[56] References Cited

U.S. PATENT DOCUMENTS

| | | | |
|---|---|---|---|
| 913,961 | 3/1909 | Levedahl | 280/276 |
| 946,143 | 1/1910 | Levedahl | 280/276 |
| 4,212,481 | 7/1980 | Ribi | 280/276 |
| 4,410,196 | 10/1983 | Ribi | 280/276 |
| 5,431,426 | 7/1995 | Ijams et al. | 280/276 |
| 5,529,327 | 6/1996 | Huang | 280/276 |

FOREIGN PATENT DOCUMENTS 223638  10/1924  United Kingdom ................... 280/276

Primary Examiner—Daniel G. DePumpo
Attorney, Agent, or Firm—Edgar W. Averill, Jr.

[57] ABSTRACT

A bicycle front suspension for supporting a front wheel of a bicycle. The front suspension has three moveable link members on each side of the front wheel. A main link is held to an extension of the head tube. A wheel support arm is pivoted in the middle and attached to a bearing in the middle of the main link. A rear control link is attached to a bearing at the top of the wheel support arm and is also linked to a bearing at the base of the head tube. A shock absorber is attached between the wheel support arm upper end and the rear end of the main link. The result of the linkage is to cause the front wheel to move vertically as it hits a bump rather than rearwardly as is normally the case with most bicycle suspensions.

4 Claims, 4 Drawing Sheets

BICYCLE FRONT SUSPENSION

BACKGROUND OF THE INVENTION

The field of the invention is bicycles and the invention relates more particularly to mountain bicycles which have a front wheel suspension which provides a travel as the front wheel hits a bump. This permits the absorption of shock and greatly improves the ride of the bicycle.

A suspension has been devised to provide generally vertical movement for the front wheel of a bicycle or a motorcycle. U.S. Pat. No. 4,179,135 provides such a linkage by utilizing a pair of pivoted arms affixed to the frame of the motorcycle at one end and to ball joints at the forward end. The steering requires an elaborate universal joint and hinge plates and has numerous pins and arms that could be easily damaged. Various linkages have been used to suspend the front end of a bicycle or motorcycle. The use of a generally horizontal link holding the front wheel is shown in U.S. Pat. Nos. 4,212,481, 4,379,567, 4,410,196, 4,531,755 and 4,570,963. A linkage utilizing an angled wheel support arm is shown in U.S. Pat. No. 5,462,302. None of the above patents teach a lightweight linkage to provide vertical movement for the front wheel of a bicycle without in any way interfering with the handling of the bicycle in rough terrain.

BRIEF SUMMARY OF THE INVENTION

It is an object of the present invention to provide a lightweight front suspension for mountain bicycles which does not interfere with the rider and which provides for vertical movement of the front wheel.

The present invention is for a bicycle front suspension for supporting the front wheel of a bicycle on the frame of a bicycle. The suspension is a pair of head tube extension rods supported by the frame and extend downwardly therefrom. The head tube extension rods each have a lower end supporting the bearing member. A main link assembly is attached to each of the pair of head tube extension rods and extend rearwardly and have an intermediate bearing member and a rear end bearing member. A pair of wheel support arms have a lower end to which the front wheel axle is affixed. Each of these wheel support arms has an intermediate bearing member which is pivotly attached to the intermediate bearing member of one of the pair of main link assemblies. The wheel support arm has an upper end with an upper end bearing member and a rearwardly extending portion which has an end which also has a bearing member. A rear control link is supported at the upper end to the frame and at the lower end to the two wheel support arms at their upper bearing members. First and second shock absorbers are affixed at an upper end to one of the rearward bearing members of the wheel support arm and at the lower end being affixed to the rear end bearing member of one of the pair of main links. The result is a relatively lightweight assembly which provides for vertical movement of the front wheel.

DESCRIPTION OF THE PREFERRED EMBODIMENTS

Figure 1:
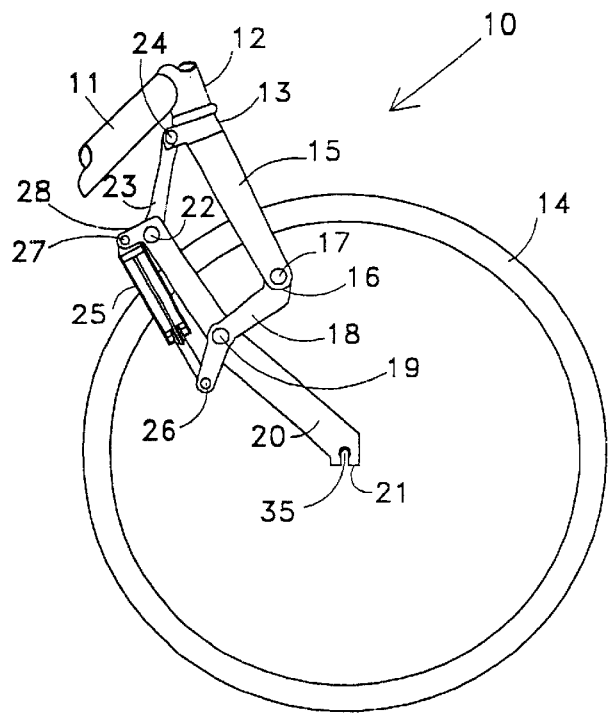
FIG. 1 is a side view of the bicycle front suspension of the present invention.
Figure 3:
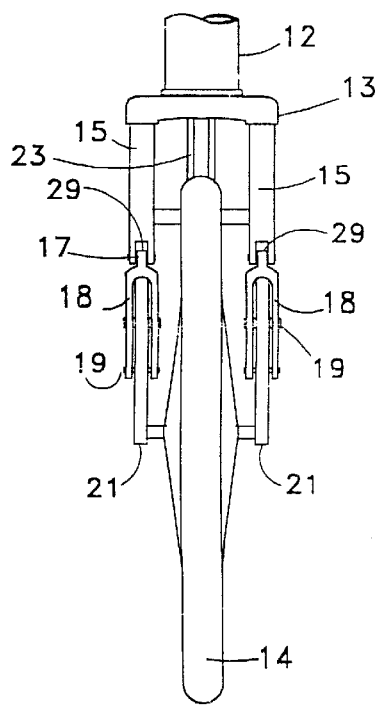
FIG. 3 is a front view thereof.
Figure 2:
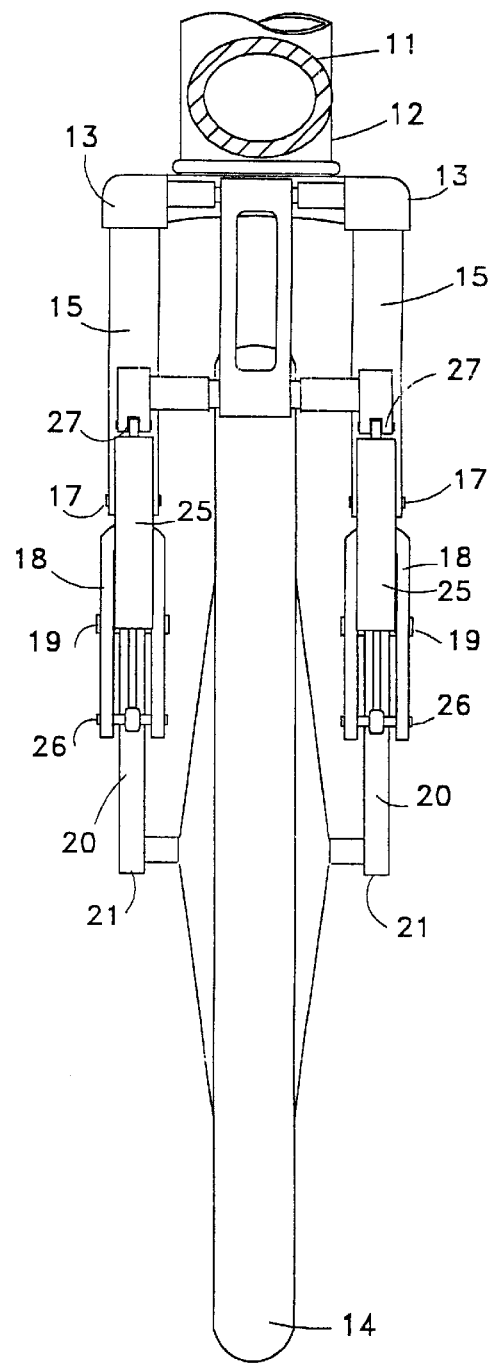
FIG. 2 is a rear view thereof.

The bicycle front suspension of the present invention is shown in side view in FIG. 1 and indicated generally by reference character 10. The bicycle has a frame 11 which includes a head tube 12. Head tube 12 supports the front wheel suspension which in turn is supported by bridge 13 shown best in FIGS. 2 and 3. As bridge 13 is turned by the handlebars (not shown) the front wheel 14 turns. Bridge 13 supports a pair of head tube extension rods 15 in a rigid manner. Head tube extension rods 15 have a lower end 16 which has a bearing member 17 which is preferably a journal bearing having a sleeve and a journal.

A pair of main links 18 also have bearing members 17 which permit the main link 18 to pivot about its forward end 29 around the lower end 16 of head tube extension rods 15. Main link 18 has an intermediate bearing member 19 which is pivotly supported by wheel support arm 20. Wheel support arm 20 has a lower end 21 which is adapted to attach a front wheel axle thereto. Wheel support arm 20 also has an intermediate bearing member coincident with intermediate bearing member 19. Wheel support arm 20 also has an upper bearing member 22. Upper bearing member 22 is pivotly held to rear control link 23 which has a lower bearing member which cooperates with upper bearing member 22 of wheel support arm 20. Rear control link 23 has an upper bearing member 24 which is held by a bearing member coincident with 24 held by bridge 13.

A shock absorber 25 is affixed between a rear end bearing member 26 at the rearward end of main link 18 at the lower end of shock absorber 25. The upper end of shock absorber 25 is held by rearward bearing member 27 held by the rearwardly extending portion 28 of wheel support arm 20.

Figure 4:
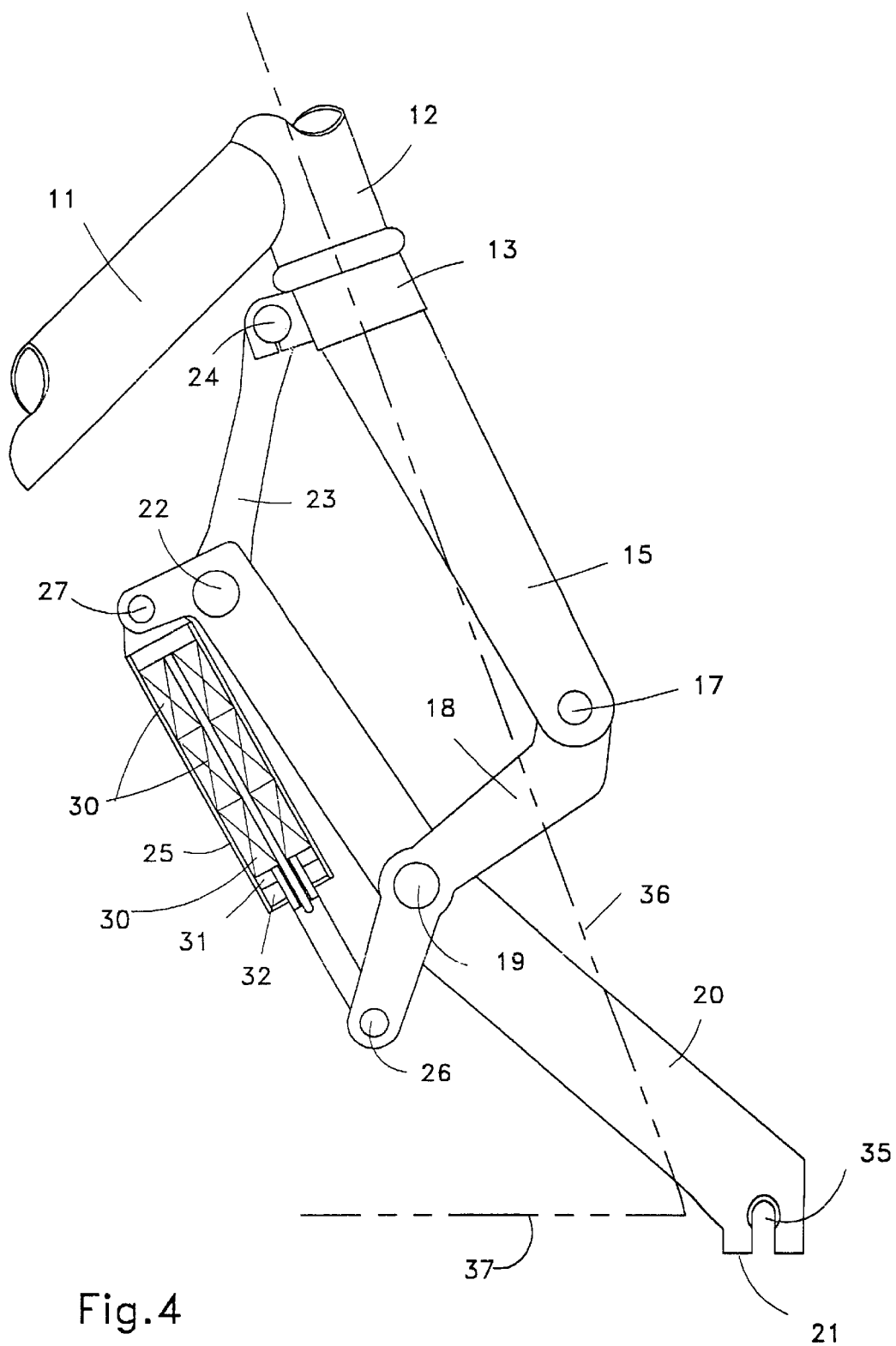
FIG. 4 is an enlarged side view of the linkage assembly of the bicycle front suspension of FIG. 1.

The details of the linkage of the front suspension are shown in side view in FIG. 4 where it can be seen that shock absorber 25 has three compression bumpers 30 which are compressed by piston 31 as rod 33 extends inwardly into the shock absorber cylinder 34. While a compression type shock absorber is shown in the drawings, of course other shock absorbing means may also be used. A shock absorber should be, however, of light weight.

Figure 5:
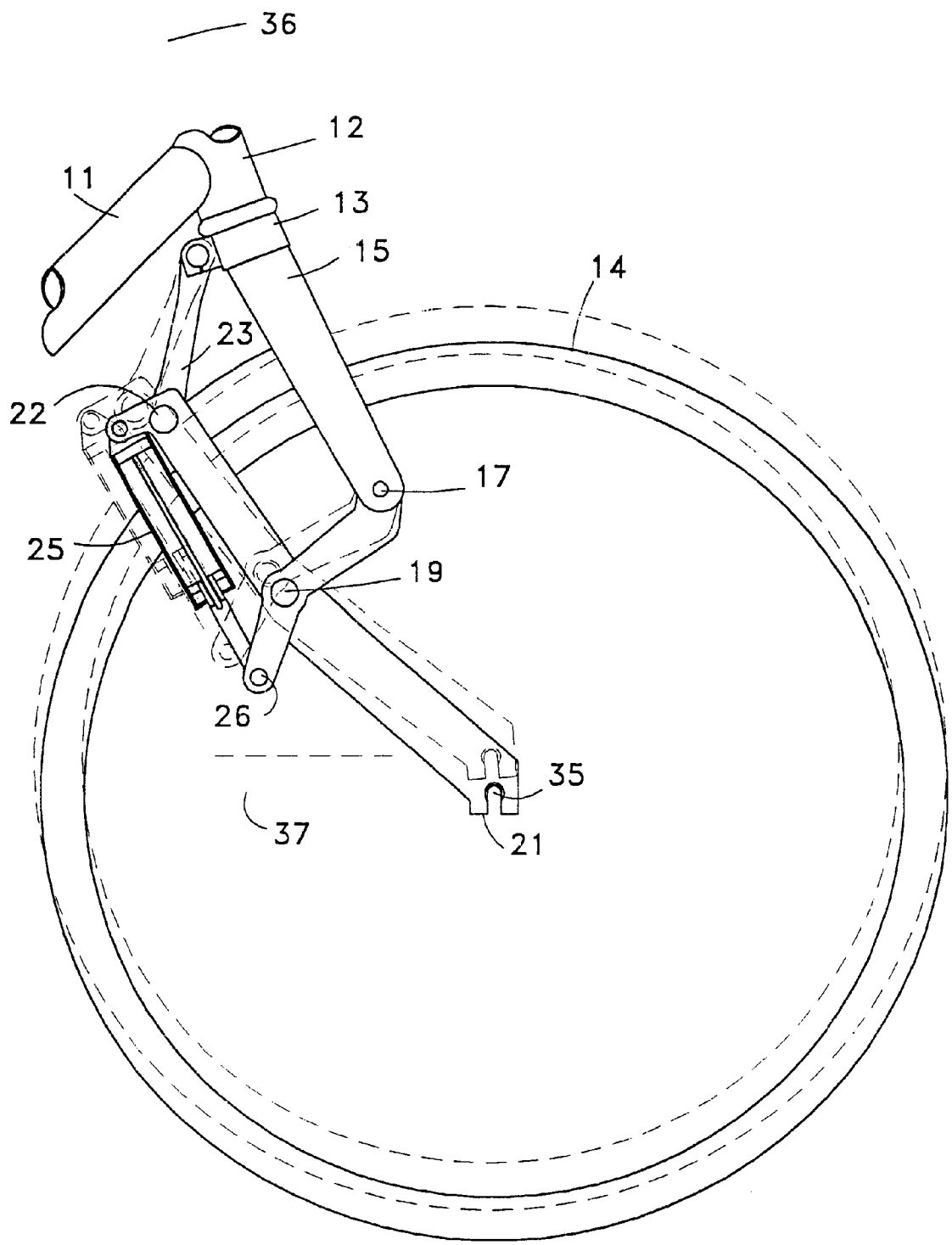
FIG. 5 is a side view of the front suspension of FIG. 1 showing the compressed position in phantom view.

The positioning of the lower end 21 and more specifically, the axle center 35 should be forward of the frame head tube central axis 36. Thus, the horizontal plane which lies along line 37 in FIG. 4 intercepts the head tube central axis 36 a distance of at least 1" behind axle center 35 and preferably about 1⅜". It also can be seen in FIG. 4 that the head tube extension rod 15 has its lower bearing member 17 forward of the frame head tube central axis 36. Furthermore, the distance between bearing member 17 and 19 is less than the distance between bearing members 22 and 24. This results in a generally vertical movement of the front wheel as it hits a bump as shown in FIG. 5. The combination of the rearward movement of bearing member 22 and the somewhat less rearward movement of bearing 19 combine to cause the movement of axle center 35 to be essentially vertical.

This vertical movement of the front wheel has many substantial advantages in the handling of a bicycle in rough terrain. The conventional movement of the front wheel of a bicycle having a front wheel suspension is along head tube central axis 36. As a result, when the front wheel is compressed upwardly the wheel length of the bicycle (that is the distance between the axles of the front and rear wheels)

decreases. As a result the turning radius of the bicycle also decreases for the same amount of turn of the handlebars. Thus, as the bicycle hits a bump the steering becomes more abrupt and different than with the suspension of the present invention. With the suspension of the present invention the wheel length is the same whether the front wheel is compressed or not. This feature causes the bicycle with the suspension of the present invention to retain predictable steering geometry. This gives the rider more control of the bike with less effort. Instead of having a constantly fluctuating steering geometry with the prior art bicycle suspension, the steering geometry remains constant.

Another major benefit of the front suspension of the present invention is the elimination of brake induced compression. With the prior art conventional bicycle front suspension, when the brakes are put on, for instance when approaching a sharp turn, the wheel length again decreases because of the inertial downward pressure placed on the front wheel. Thus, as the rider turns and brakes, the steering becomes sharper which creates the necessity to compensate for this changed steering geometry. This further complicates the difficult job of controlling a mountain bicycle in a sharp downhill turn.

Figure 6:
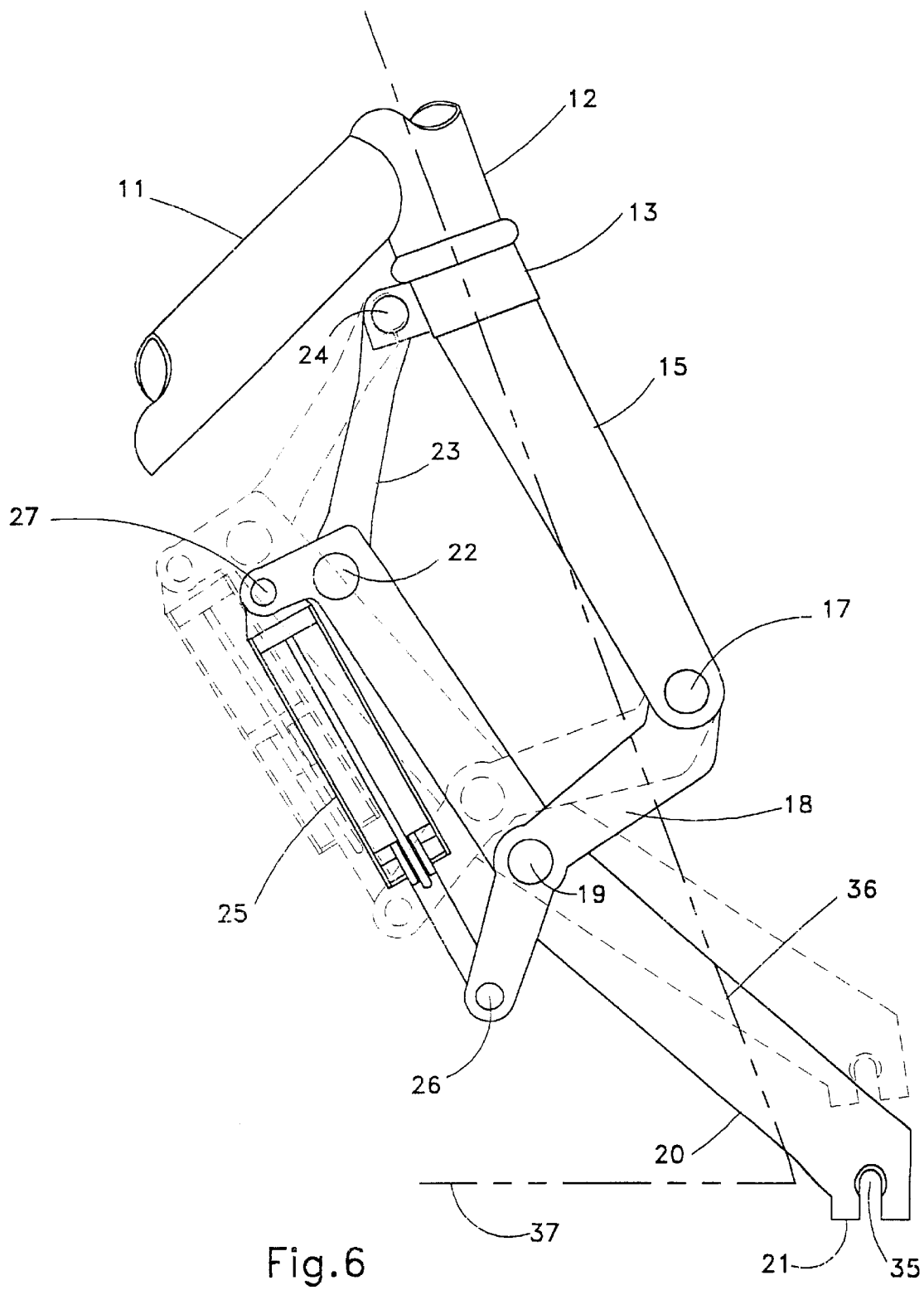
FIG. 6 is an enlarged view of the linkage assembly of FIG. 1 showing the compressed position in phantom lines.

The steering geometry is shown in enlarged view in FIG. 6 where a 4" upward movement of the axle center 35 is shown. The compression of the shock absorber is also indicated in the phantom lines in FIG. 6. The result of the design of the front suspension of the present invention is not only compact and lightweight, but provides a much easier steering control for the rider in rough downhill terrain. This allows the rider to concentrate on other factors without having to worry about a changing steering geometry.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A bicycle front suspension for supporting a front wheel of a bicycle on to a frame of a bicycle, said suspension causing the front wheel to move vertically when compressed, said suspension comprising:

a pair of head tube extension rods supported by the frame and extending downwardly therefrom, said head tube extension rods each having a lower end and said lower end of each of said head tube extension rods supporting a head tube lower bearing member;

a pair of main link assemblies, each main link assembly having a forward end and a rear end being pivotally linked at a forward end bearing member to the head tube lower bearing member at the lower end of one of said pair of head tube extension rods and extending rearwardly from the head tube extension rod, each of said pair of main link assemblies having an intermediate bearing member and a rear end bearing member said intermediate bearing member being positioned between said forward bearing member and said rear end bearing member and said rear end bearing member being adjacent the rear end of the pair of main link assemblies;

a pair of wheel support arms each having a lower end for attachment of a front wheel axle, an intermediate bearing member, pivotally attached to said intermediate bearing member of one of said pair of main link assemblies and each of said pair of wheel support arms having an upper end with an upper bearing member and a rearwardly extending portion extending rearwardly from the upper end of the wheel support arms having a rearward terminus with a rearward bearing member said intermediate bearing member being positioned between said lower end and said upper bearing member;

rear control link means having an upper end having an upper bearing supported by the frame and a lower end having a lower bearing which pivotally holds the upper bearing member of both of said pair of wheel support arms; and first and second shock absorber means each having a upper end and a lower end, said first shock absorber means being affixed at an upper end to one of said pair of rearward bearing members of said wheel support arm and the second of said shock absorbing means being affixed at an upper end to the other of said pair of rearward bearing members and a lower end of said first shock absorber means being affixed to the rear end bearing member of one of said pair of main links and the lower end of the second shock absorber means being affixed to the rear end bearing member of the other of said pair of main links whereby when the front wheel hits a bump, the lower end of the wheel support arm moves upwardly, the intermediate bearing member of the wheel support arm moves upwardly and rearwardly and the upper bearing member of the wheel support arm moves upwardly and rearwardly and the shock absorber means is compressed.

2. The bicycle front suspension of claim 1 wherein the front wheel has a steering axis and the wheel axis lies in a horizontal plane and wherein said steering axis intersects the horizontal plane at a point behind the wheel axis.

3. The bicycle front suspension of claim 2 wherein the bearing members of said head tube extension rods lie in a horizontal plane and said steering axis intersects said horizontal plane of said bearing members of said head tube extension rod behind said bearing members of said head tube extension rods.

4. The bicycle front suspension of claim 3 wherein a distance between the upper and lower bearings of said rear control link is greater than a distance between the forward end and intermediate bearing members of said main link assemblies.

* * * * *